(No Model.)
P. C. OHL.
INSULATOR FOR ELECTRICAL CONDUCTORS.
No. 280,947. Patented July 10, 1883.
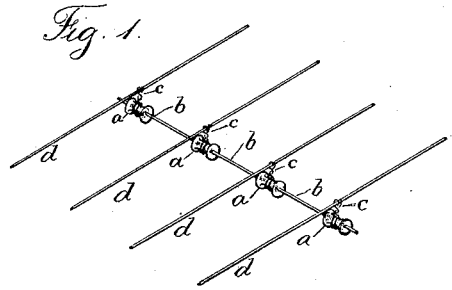
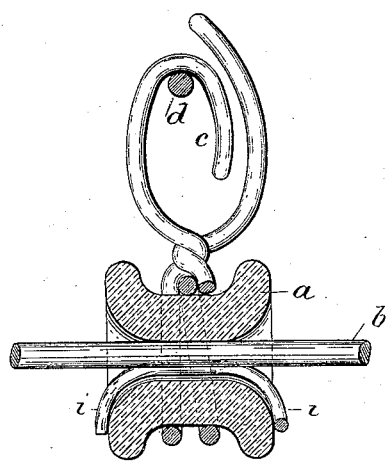
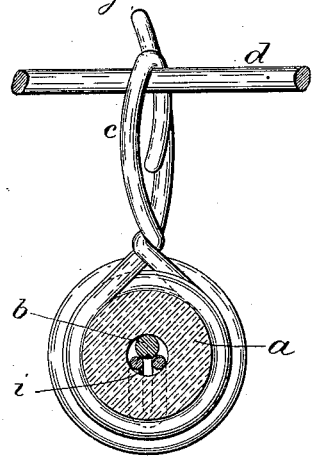
Witnesses
J. Haib
Chas H. Smith
Inventor
Percy C. Ohl
per Lemuel W. Serrell atty

UNITED STATES PATENT OFFICE.

PERCY C. OHL, OF PLAINFIELD, NEW JERSEY.

INSULATOR FOR ELECTRICAL CONDUCTORS.

SPECIFICATION forming part of Letters Patent No. 280,947, dated July 10, 1883.

Application filed November 9, 1882. (No model.)

*To all whom it may concern:*

Be it known that I, PERCY C. OHL, of Plainfield, in the county of Union and State of New Jersey, have invented an Improvement in Insulators for Electrical Conductors, of which the following is a specification.

In telephonic and telegraphic conductors the wires that are suspended upon poles are liable to be swayed by the wind and to come into contact with each other, and with telephones the induction produces false sounds, even if the wires do not actually touch. For these reasons it is usual to place the poles much nearer to each other than is necessary for the support of the wires.

My invention relates to the combination, with insulators, of a connecting - stretcher whereby the insulators can be kept at the proper distance apart, and be placed upon the wires at the pole, and then drawn along about midway of the poles, and then allowed to remain so as to preserve the proper distance between the wires, and prevent them swaying toward and from each other by the action of the wind.

In the drawings, Figure 1 is a perspective view of the insulators applied to the wires. Fig. 2 is a longitudinal section of an insulator; and Fig. 3 is a cross-section, in larger size, of one of the insulators.

The insulators $a$ are made of porcelain, glass, or other suitable material, and they may be of any suitable shape, and they are connected to each other by a stretcher, $b$, so as to be kept at the proper distance apart. The insulators are placed upon the wires at or near the poles, the stretcher $b$ applied to connect them, and then they are drawn along by a cord or rope to near the middle between the poles, and allowed to remain to preserve the proper distance between the respective wires. Insulators and stretchers are to be applied to each range of wires between the poles whenever required. I prefer to employ a small round insulator of porcelain with a hole through it and a peripheral groove, as shown. Around the insulator wire is wound, and its ends bent to form hooks $c$, that are passed over the conductor $d$. Then the insulators are threaded upon the cross-stretcher $b$. This may be a piece of wood, or a piece of wire, or a wire bent double; and to prevent the insulator slipping endwise upon the stretcher by the action of the wind, I apply any suitable spring, such as a piece of wire bent double, laid through the hole of the insulator, and then turned down at the ends, as seen at $i$, so as to retain the same in place. As the stretcher-wire is passed through the insulator, these spring-wires are pressed aside sufficiently to produce a friction on the same. It will be apparent that the parts may be constructed in any suitable manner to prevent the insulators slipping thereon, and that the insulators may be of any suitable pattern.

The insulators may be secured upon the stretcher at distances apart corresponding to the wires, and then the insulators may be hooked to the wires, or else the stretcher may be passed through the insulators after they are connected to the line-wires.

In instances where stretchers have been proposed for keeping the wires apart, the insulators had to be threaded upon the wires, and hence could only be applied while the lines were being put up. By my improvement the hooks allow for the insulators being connected upon the wires after they are stretched.

I claim as my invention—

1. The combination, with the suspended conductors, of insulators, a stretcher to connect such insulators together, and means for removably connecting each conductor with its insulator, substantially as set forth.

2. The insulators $a$, of non-conducting material, and the hooks $c$ for the same, adapted to being passed over the suspended electric conductors, in combination with the stretcher that keeps the conductors at the proper distance apart, substantially as set forth.

Signed by me this 31st day of October, A. D. 1882.

PERCY C. OHL.

Witnesses:
A. D. MALLINSON,
P. B. WRIGHT.